(12) United States Patent
Dhong et al.

(10) Patent No.: US 6,175,852 B1
(45) Date of Patent: Jan. 16, 2001

(54) HIGH-SPEED BINARY ADDER

(75) Inventors: Sang Hoo Dhong; Hung Cai Ngo, both of Austin; Kevin John Nowka, Round Rock, all of TX (US)

(73) Assignee: International Business Machines Corporation, Armonk, NY (US)

(*) Notice: Under 35 U.S.C. 154(b), the term of this patent shall be extended for 0 days.

This patent is subject to a terminal disclaimer.

(21) Appl. No.: 09/114,117

(22) Filed: Jul. 13, 1998

(51) Int. Cl.[7] .................................................... G06F 7/50
(52) U.S. Cl. ................................. 708/712; 708/710
(58) Field of Search .................................. 708/712, 711, 708/713, 710

(56) References Cited

U.S. PATENT DOCUMENTS

| | | | |
|---|---|---|---|
| 4,764,886 | * 8/1988 | Yano | 708/712 |
| 5,140,546 | * 8/1992 | Ishikawa et al. | 708/712 |
| 5,500,813 | * 3/1996 | Song et al. | 708/712 |
| 5,964,827 | * 10/1999 | Ngo et al. | 708/710 |

* cited by examiner

*Primary Examiner*—David H. Malzahn
(74) *Attorney, Agent, or Firm*—Casimer K. Salys; Felsman, Bradley, Vaden, Gunter & Dillon, LLP

(57) ABSTRACT

A high-speed carry-lookahead binary adder is disclosed. The binary adder includes multiple rows of carry-lookahead circuits, a half-sum module, and a sum/carry module. A first carry-lookahead circuit row includes multiple eight-bit group generate circuits and multiple eight-bit group propagate circuits. Each of the eight-bit group generate circuits produces a generate signal for a corresponding bit location. Each of the eight-bit group propagate circuits produces a propagate signal for a corresponding bit location. The half-sum module is utilized to generate a half-sum signal. By utilizing the half-sum signal, the generate signals, and the propagate signals, the sum/carry module generates sum signals and a carry signal.

16 Claims, 5 Drawing Sheets

HIGH-SPEED BINARY ADDER

BACKGROUND OF THE INVENTION

1. Technical Field

The present invention relates to an apparatus for data processing in general, and in particular to a binary adder. Still more particularly, the present invention relates to a high-speed carry-lookahead binary adder.

2. Description of the Prior Art

Binary adders having a carry-lookahead are well known in the art. This type of binary adder is able to add two multiple-bit binary numbers while simultaneously computing a carry signal for each bit.

In order to compute the sum of two multiple-bit binary numbers A and B, a generate signal and a propagate signal are initially produced at each bit location. The equation for a generate signal $G(i)$ is $G(i)=A(i)B(i)$, and the equation for propagate signal $P(i)$ is $P(i)=A(i)\overline{B(i)}+\overline{A(i)}B(i)$ or $A(i) \otimes B(i)$, where i denotes a bit location within the binary umbers having bit 0 as the most significant bit. These generate signals and propagate signals are then utilized to produce a carry signal for each bit. The generalized equation for a carry signal $C(i)$ is $C(i)=G(i)+P(i)G(i+1)+P(i)P(i+1)G(i+2)+P(i)P(i+1)P(i+2)G(i+3)+ \ldots$, etc.

The present disclosure provides an improved binary adder capable of producing group generate signals and group propagate signals with fewer levels of logic than is required by the prior art.

SUMMARY OF THE INVENTION

In accordance with a preferred embodiment of the present invention, a binary adder includes multiple rows of carry-lookahead circuits, a half-sum module, and a sum/carry module. A first carry-lookahead circuit row includes multiple eight-bit group generate circuits and multiple eight-bit group propagate circuits. Each of the eight-bit group generate circuits produces a generate signal for a corresponding bit location. Each of the eight-bit group propagate circuits produces a propagate signal for a corresponding bit location. The half-sum module is utilized to generate a half-sum signal. By utilizing the half-sum signal, the generate signals, and the propagate signals, the sum/carry module generates sum signals and a carry signal.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

A preferred embodiment of the present invention and its advantages are better understood by referring to FIGS. 1–5, like numerals being utilized for like and corresponding parts.

Figure 1:
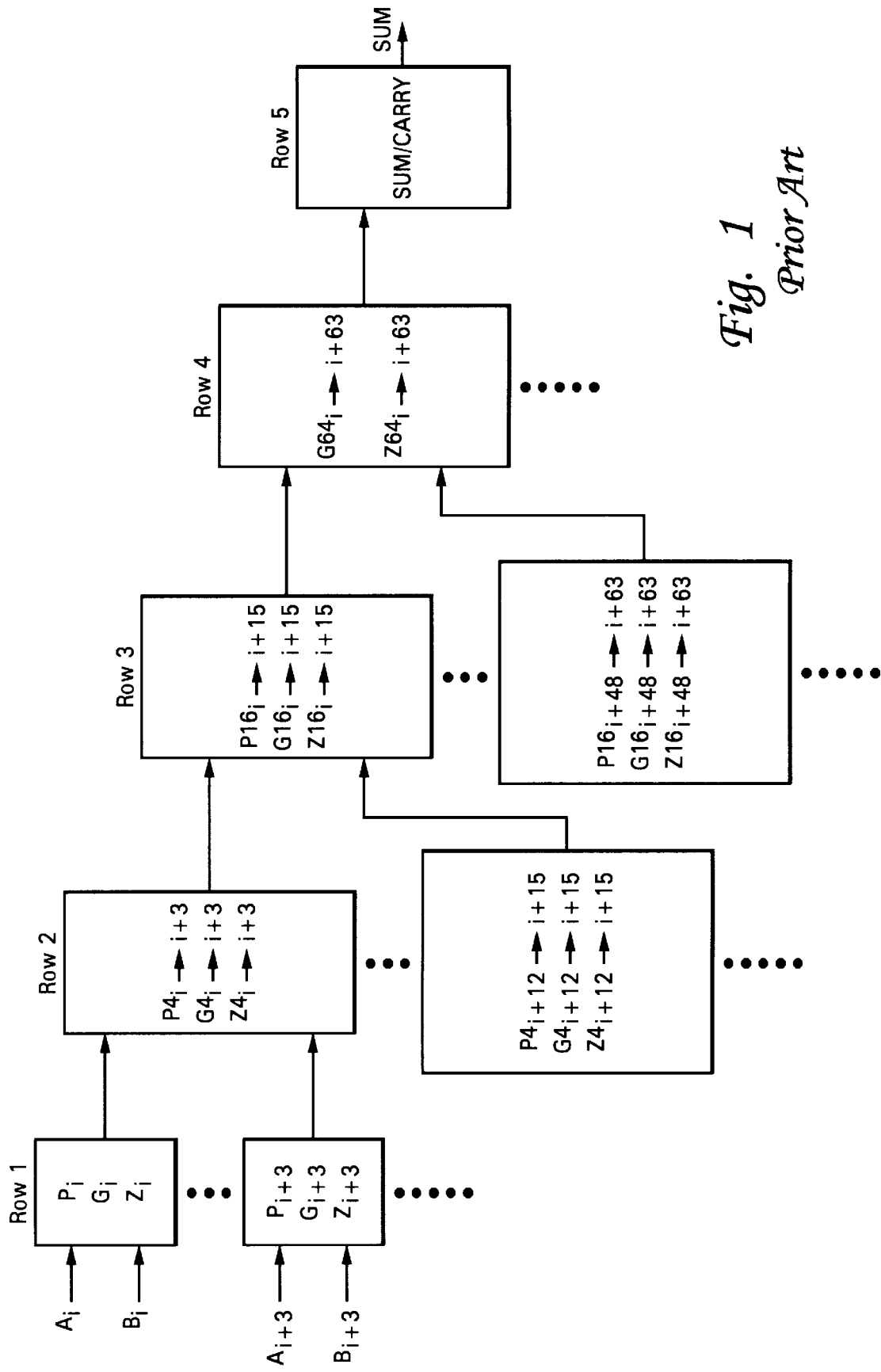
FIG. 1 is a pictorial representation of the generation of generate signals and propagate signals, according to the prior art.

With reference now to the drawings, and in particular to FIG. 1, there is illustrated a pictorial representation of the generation of generate signals and propagate signals, according to the prior art. As shown, generate signals G(i), propagate signals P(i), and zero signals Z(i) are produced by carry-lookahead circuits in Row 1, where $Z(i)=\overline{A(i)}\ \overline{B(i)}$. These signals are then utilized by carry-lookahead circuits in Row 2 to produce group generate signals G4( ), group propagate signals P4( ), and group zero signals Z4( ). The group generate signals G4( ), group propagate signals P4( ), and group zero signals Z4( ) are subsequently utilized by carry-lookahead circuits in Row 3 to produce group generate signals G16( ), group propagate signals P16( ), group zero signals Z16( ). Similarly, the group generate signals G16( ), group propagate signals P16( ), and group zero signals Z16( ) are subsequently utilized by carry-lookahead circuits in Row 4 to produce group generate signals G64( ) and group zero signals Z64( ). Finally, a set of sum/carry circuits in Row 5 is utilized to generate a set of sum signals. Hence, under this arrangement according to the prior art, a 64-bit binary adder may require up to four rows of carry-lookahead circuits in order to produce a set of sum signals.

Figure 2:
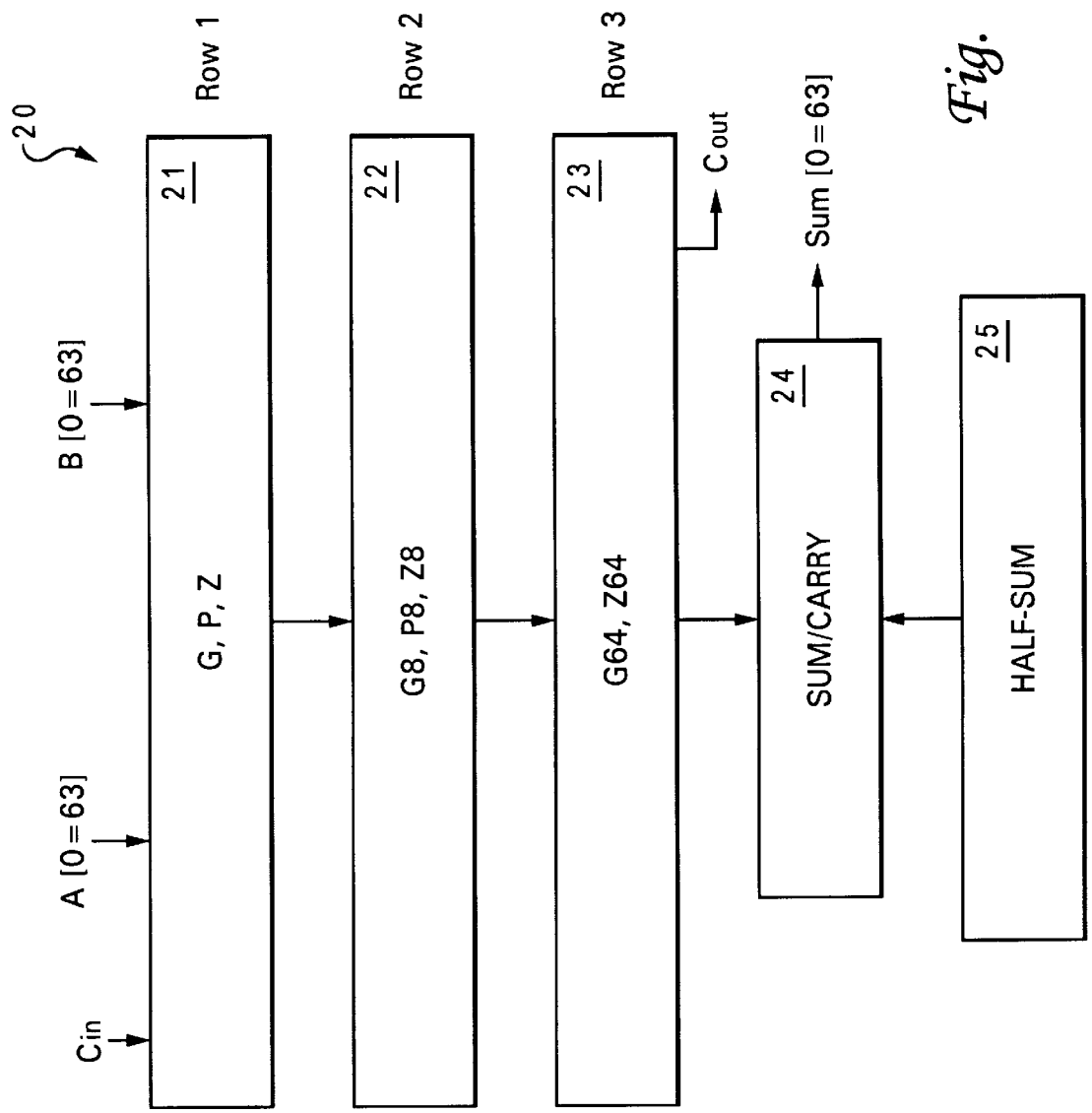
FIG. 2 is a binary adder in accordance with a preferred embodiment of the present invention.

With reference now to FIG. 2, there is depicted a binary adder 20 in accordance with a preferred embodiment of the present invention. Binary adder 20 receives a first binary number A, a second binary number B, and a carry-in signal $C_{in}$. For purposes of illustration, binary adder 20 is a 64-bit binary adder. Thus, binary number A includes bits A(0)–A(63) and binary number B includes bits B(0)–B(63), with bit 0 being the most significant bit and bit 63 being the least significant bit. Binary adder 20 includes only three levels of carry-lookahead circuits—Row 1, Row 2, and Row 3. Carry-lookahead circuits 21 in Row 1 are utilized to produce group generate signals G( ), group propagate signals P( ), and group zero signals Z( ). Carry-lookahead circuits 22 in Row 2 are utilized to produce group generate signals G8( ), group propagate signals P8( ), and group zero signals Z8( ). Carry-lookahead circuits 23 in Row 3 are utilized to produce group generate signals G64( ) and group zero signals Z64( ). Half-sum module 25 is utilized to produce a half-sum signal. By combining the group signals from Row 3 with the half-sum signal generated by half-sum module 25, binary adder 20 produces a set of sum signals SUM(0)–SUM(63) and a carry-out signal $C_{out}$ via a sum/carry module 24. Although a 64-bit adder is utilized to illustrate the present invention, it will be understood by those skilled in the art that similar circuitry and logic may be utilized for binary adders having a different number of bits.

In accordance with a preferred embodiment of the present invention, a generate signal G(i) is defined as $G(i)=A(i)B(i)$, a propagate signal P(i) is defined as $P(i)=A(i) \otimes B(i)$, and a zero signal Z(i) is defined as $Z(i)=\overline{A(i)} \; \overline{B(i)}$. Accordingly, G8(0) of the group generate G8 signals in Row 2 of FIG. 2 can be written as:

$$G8(0)=G(0)+P(0)G(1)+P(0)P(1)G(2)+P(0)P(1)P(2)G(3)+$$
$$P(0)P(1)P(2)P(3)G(4)+P(0)P(1)P(2)P(3)P(4)G(5)+$$
$$P(0)P(1)P(2)P(3)P(4)P(5)G(6)+$$
$$P(0)P(1)P(2)P(3)P(4)P(5)P(6)G(7).$$

In addition, P8(0) of the group propagate P8 signals in Row 2 of FIG. 2 can be written as:

$$P8(0)=P(0)P(1)P(2)P(4)P(5)P(6)P(7).$$

Also, Z8(0) of the group zero Z8 signals in Row 2 of FIG. 2 can be written as:

$$Z8(0)=Z(0)+P(0)Z(1)+P(0)P(1)Z(2)+P(0)P(1)P(2)Z(3)+$$
$$P(0)P(1)P(2)P(3)Z(4)+P(0)P(1)P(2)P(3)P(4)Z(5)+$$
$$P(0)P(1)P(2)P(3)P(4)P(5)Z(6)+P(0)P(1)P(2)P(3)P(4)P(5)P(6)Z(7).$$

Further, G64(0) of the group generate G64 signals in Row 3 of FIG. 2 can be written as:

$$G64(0)=G8(0)+P8(0)G8(8)+P8(0)P8(8)G8(16)+$$
$$P8(0)P8(8)P8(16)G8(24)+$$
$$8P8(0)P8(8)P8(16)P8(24)G8(32)+$$
$$P8(0)P8(8)P8(16)P8(24)P8(32)G8(40)+$$
$$P8(0)P8(8)P8(16)P8(24)P8(32)P8(40)G8(48)+$$
$$P8(0)P8(8)P8(16)P8(24)P8(32)P8(40)P8(48)G8(56)$$

The G64(0) equation also is utilized for generating carry out $C_{out}$ signal in Row 3. On the other hand, Z64(0) of the group zero Z64 signals in Row 3 of FIG. 2 can be written as:

$$Z64(0)=Z8(0)+P8(0)Z8(8)+P8(0)P8(8)Z8(16)+$$
$$P8(0)P8(8)P8(16)Z8(24)+$$
$$P8(0)P8(8)P8(16)P8(24)Z8(32)+$$
$$P8(0)P8(8)P8(16)P8(24)P8(32)Z8(40)+$$
$$P8(0)P8(8)P8(16)P8(24)P8(32)P8(40)Z8(48)+$$
$$P8(0)P8(8)P8(16)P8(24)P8(32)P8(40)P8(48)Z8(56)$$

In order to generate sum signals SUM(i), the group signals generated in Row 3 of FIG. 2 are utilized in conjunction with a half-sum from half-sum module 25. Half-sum HS(i) may be combined with a carryout signal C(i) in sum/carry module 24 to produce a SUM(i) such that $SUM(i)=HS(i) \otimes C(i+1)$. For example, $SUM(0)=HS(0) \otimes C(1)$, where HS(0) and C(1) are a half-sum of bit 0 and a carryout of bit 1, respectively.

Figure 3:
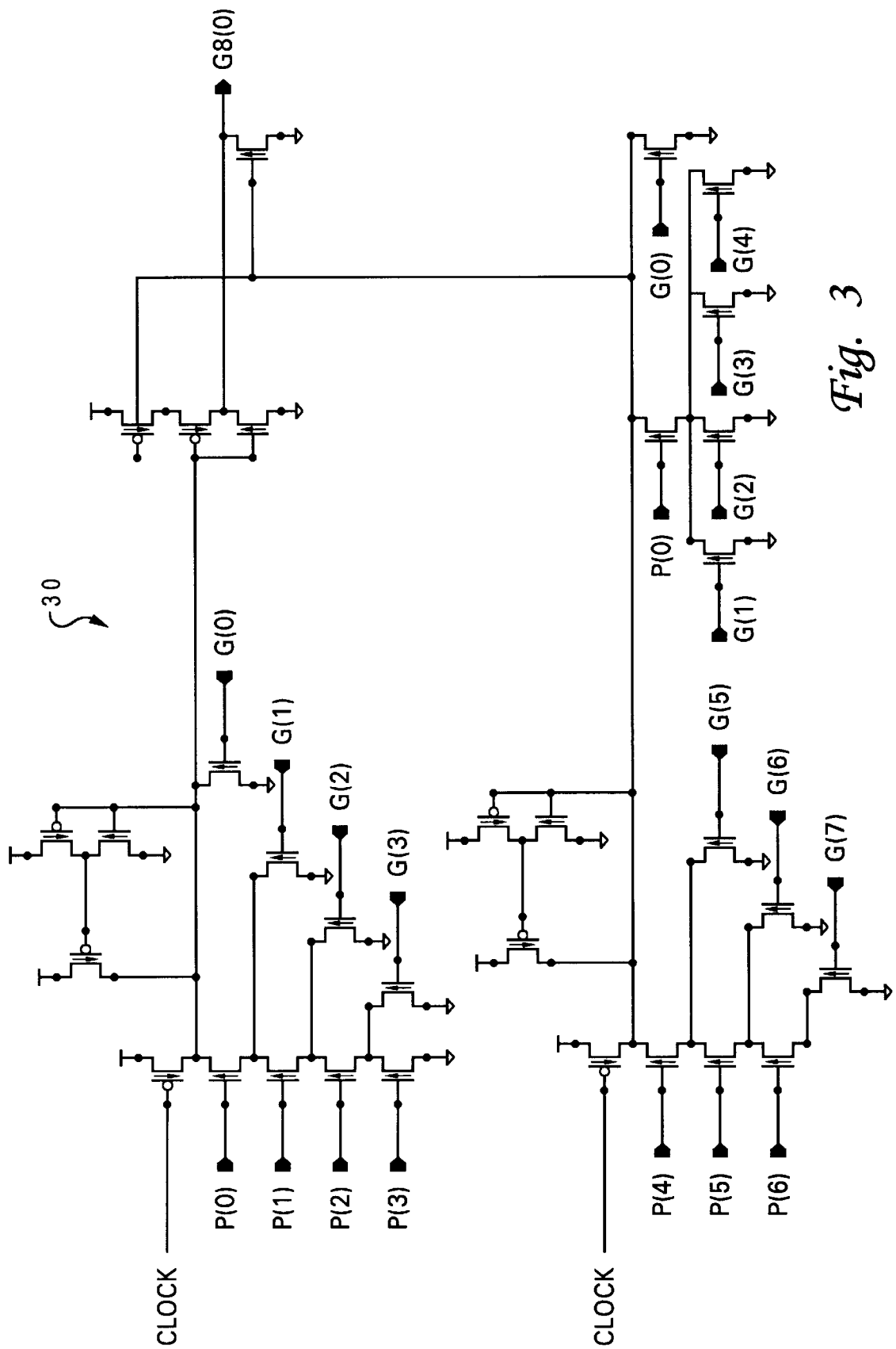
FIG. 3 is a schematic diagram of a circuit for generating a group generate signal G8(0), in accordance with a preferred embodiment of the present invention.
Figure 4:
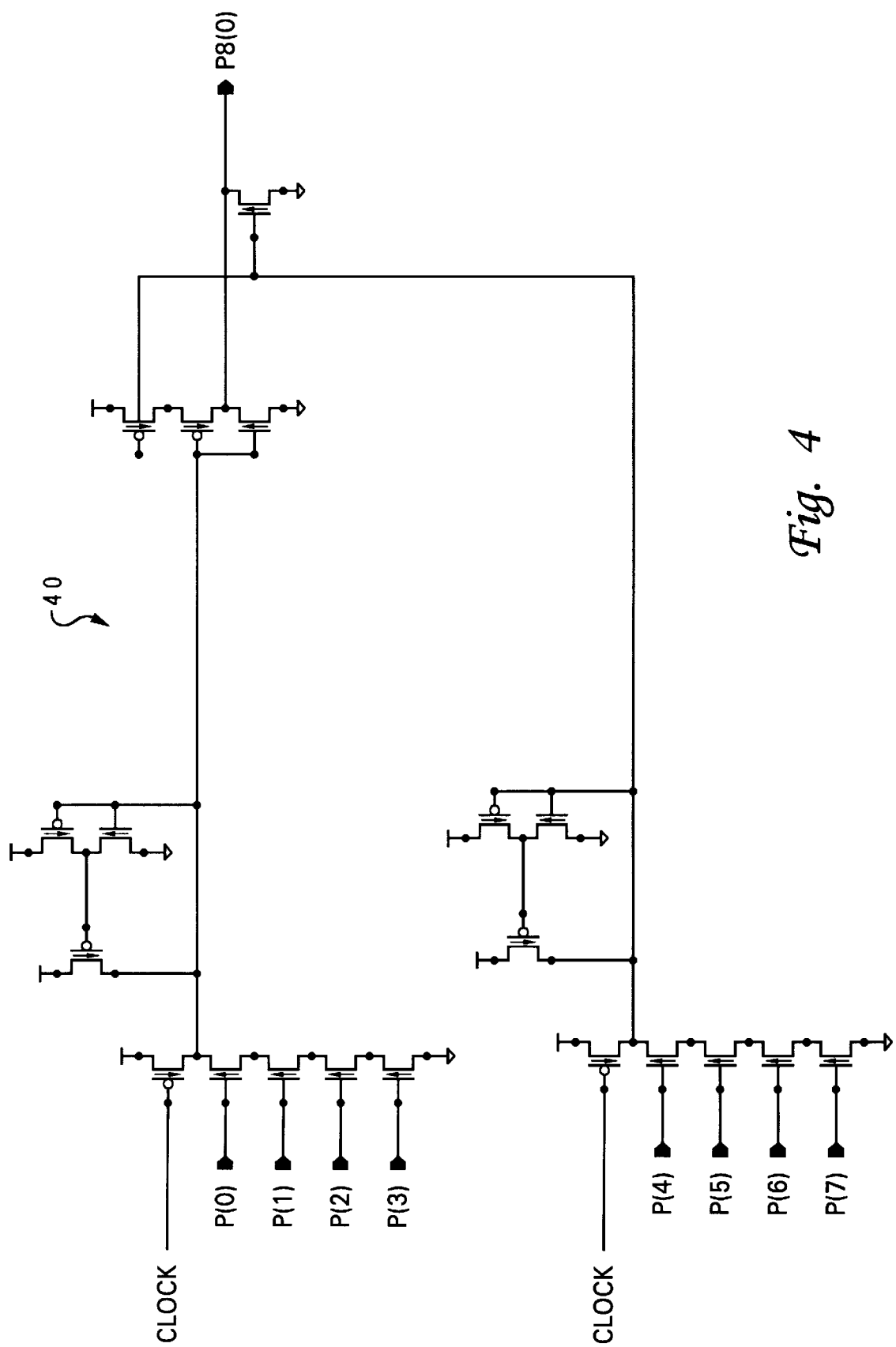
FIG. 4 is a schematic diagram of a circuit for generating a group propagate signal P8(0), in accordance with a preferred embodiment of the present invention.
Figure 5:
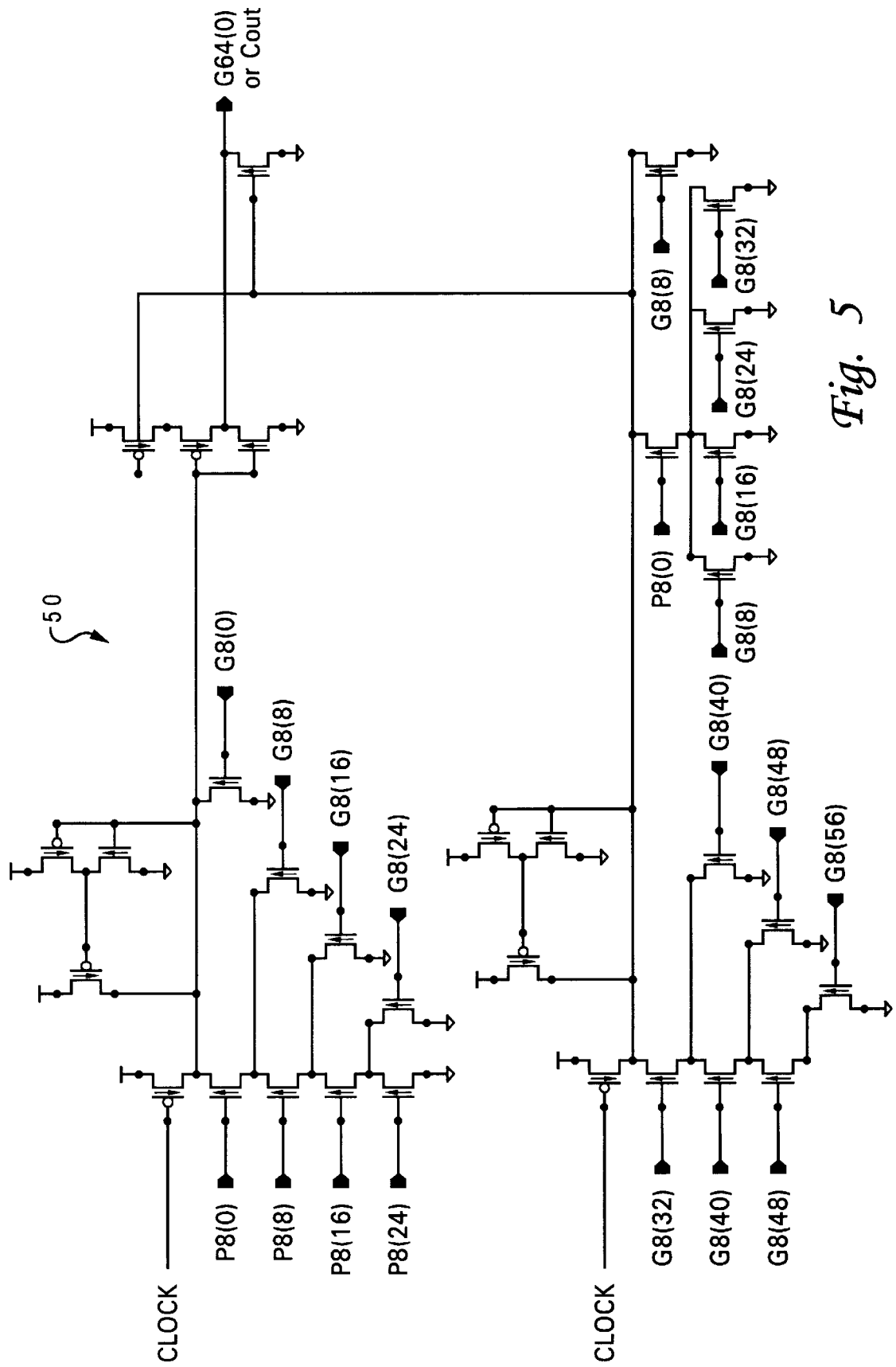
FIG. 5 is a schematic diagram of a circuit for generating a group generate signal G64(0) or $C_{out}$, in accordance with a preferred embodiment of the present invention.

FIGS. 3 through 5 illustrate only a partial quantity of the bits of binary numbers A and B. However, it will be understood that the schematic diagrams depicted in these figures may be duplicated and utilized in a manner similar to that illustrated in order to generate the various necessary signals for the remaining quantity of bits.

Referring now to FIG. 3, there is depicted a schematic diagram of a circuit for generating a group generate signal G8(0), in accordance with a preferred embodiment of the present invention. Group generate circuit 30 is preferably included within Row 2 of FIG. 2. Those skilled in the art will recognize that group generate circuit 30 is only one implementation example of the G8(0) equation shown above. It is also understood that the circuits within Row 2 of FIG. 2 that generate other group generate G8 signals, such as G8(8), G8(16), G8(24), etc., are similar to group generate circuit 30.

With reference now to FIG. 4, there is depicted a schematic diagram of a circuit for generating a group propagate signal P8(0), in accordance with a preferred embodiment of the present invention. Group propagate circuit 40 is preferably included within Row 2 of FIG. 2. Those skilled in the art will recognize that group propagate circuit 40 is only one example of an implementation of the P8(0) equation shown above. It is also understood that the circuits within Row 2 of FIG. 2 that generate other group propagate P8 signals, such as P8(8), P8(16), P8(24), etc., are similar to group propagate circuit 40.

Referring now to FIG. 5, there is depicted a schematic diagram of a circuit for generating a group generate signal G64(0), in accordance with a preferred embodiment of the present invention. Group generate signal G64(0) is produced utilizing group generate signals G8(0), G8(8), G8(16), G8(24), G8(32), G8(40), G8(48), G8(56), and group propagate signals P8(0), P8(8), P8(16), P8(24), P8(32), P8(40), and P8(48). Group generate circuit 50 is preferably included within Row 3 of FIG. 2. Those skilled in the art will recognize that group generate circuit 50 is only one example of an implementation of the G64(0) equation shown above. It is also understood that the circuits within Row 3 of FIG. 2 that generate other group generate G64 signals, such as G64(16), G64(32), and G64(48), are similar to group generate circuit 50.

A circuit for generating a carry signal $C_{out}$ is identical to group generate circuit 50. The circuit for generating a carry signal $C_{out}$ is also included within sum/carry module 24 of FIG. 2.

As has been described, the present invention provides an improved binary adder. According to the present invention, a group of eight-bit generate signals and propagate signals can be generated in one row (or level) of carry-lookahead circuits. The number of steps required to generate the generate, propagate, and carry signals are generally proportional to the width (bitwise) of the binary adder, and inversely proportional to the size of the group propagate and group generate signals utilized. By utilizing a group of eight bits, instead of two in the prior art, for the group propagate and group generate signals, the number of logic levels required to generate the carry bits can generally be reduced. Furthermore, by reducing the number of rows of carry-lookahead circuits required, the performance of the carry-lookahead binary adder is greatly improved.

It is understood the carry-lookahead binary adder as described may be applicable in a variety of processing devices. These processing devices include but are not limited to complex instruction set computing (CISC) processors and reduced instruction set computing (RISC) processors. Such processors typically comprise at least one processing unit, one or more cache memories associated with each processing unit, and various control logic circuits as are well-known in the art.

While the invention has been particularly shown and described with reference to a preferred embodiment, it will be understood by those skilled in the art that various changes in form and detail may be made therein without departing from the spirit and scope of the invention.

What is claimed is:

1. A binary adder for adding a first multiple-bit number to a second multiple-bit number, comprising:

a plurality of rows of carry-lookahead circuits, wherein one of said plurality of rows of carry-lookahead circuits includes a plurality of eight-bit group generate circuits and a plurality of eight-bit group propagate circuits, wherein each of said eight-bit group generate circuits generates a generate signal for a corresponding bit location of said multiple-bit numbers, wherein each of said eight-bit group propagate circuits generates a propagate signal for a corresponding bit location of said multiple-bit numbers;

a half-sum module for generating a half-sum signal; and a sum/carry module coupled to said half-sum module and to said plurality of rows of carry-lookahead circuits, wherein said sum/carry module generates a sum signal utilizing said half-sum signal, said generate signals, and said propagate signals.

2. The binary adder according to claim 1, wherein said one row of said plurality of rows includes a group generate signal $G8(0)$ defined by:

$$G8(0)=G(0)+P(0)G(1)+P(0)P(1)G(2)+P(0)P(1)P(2)G(3)+$$
$$P(0)P(1)P(2)P(3)G(4)+P(0)P(1)P(2)P(3)P(4)G(5)+$$
$$P(0)P(1)P(2)P(3)P(4)P(5)Z(6)+$$
$$P(0)P(1)P(2)P(3)P(4)P(5)P(6)G(7).$$

3. The binary adder according to claim 1, wherein said one row of said plurality of rows includes a group propagate signal $P8(0)$ defined by:

$$P8(0)=P(0)P(1)P(2)P(4)P(5)P(6)P(7).$$

4. The binary adder according to claim 1, wherein said one row of said plurality of rows includes a group zero signal $Z8(0)$ defined by:

$$Z8(0)=Z(0)+P(0)Z(1)+P(0)P(1)Z(2)+P(0)P(1)P(2)Z(3)+$$
$$P(0)P(1)P(2)P(3)Z(4)+P(0)P(1)P(2)P(3)P(4)Z(5)+$$
$$P(0)P(1)P(2)P(3)P(4)P(5)Z(6)+$$
$$P(0)P(1)P(2)P(3)P(4)P(5)P(6)Z(7).$$

5. The binary adder according to claim 1, wherein another one of said plurality of rows of carry-lookahead circuits includes a plurality of 64-bit group generate circuits and a plurality of 64-bit group propagate circuits.

6. The binary adder according to claim 3, wherein said another row of said plurality of rows includes a group generate signal $G64(0)$ defined by:

$$G64(0)=G8(0)+P8(0)G8(8)+P8(0)P8(8)G8(16)+$$
$$P8(0)P8(8)P8(16)G8(24)+$$
$$P8(0)P8(8)P8(16)P8(24)G8(32)+$$
$$P8(0)P8(8)P8(16)P8(24)P8(32)G8(40)+$$
$$P8(0)P8(8)P8(16)P8(24)P8(32)P8(40)G8(48)+$$
$$P8(0)P8(8)P8(16)P8(24)P8(32)P8(40)P8(48)G8(56).$$

7. The binary adder according to claim 4, wherein said carry signal equals $G64(0)$.

8. The binary adder according to claim 1, wherein a sum signal $SUM(0)$ is defined by $HS(0) \otimes C(1)$.

9. A processing device having a binary adder for adding a first multiple-bit number to a second multiple-bit number, comprising:

a processing unit;

a memory associated with said processing unit; and said processing unit further comprises:

a plurality of rows of carry-lookahead circuits, wherein one of said plurality of rows of carry-lookahead circuits includes a plurality of eight-bit group generate circuits and a plurality of eight-bit group propagate circuits, wherein each of said eight-bit group generate circuits generates a generate signal for a corresponding bit location of said multiple-bit numbers, wherein each of said eight-bit group propagate circuits generates a propagate signal for a corresponding bit location of said multiple-bit numbers;

a half-sum module for generating a half-sum signal; and a sum/carry module coupled to said half-sum module and to said plurality of rows of carry-lookahead circuits, wherein said sum/carry module generates a sum signal utilizing said half-sum signal, said generate signals, and said propagate signals.

10. The processing device according to claim 9, wherein said one row of said plurality of rows includes a group generate signal $G8(0)$ defined by:

$$G8(0)=G(0)+P(0)G(1)+P(0)P(1)G(2)+P(0)P(1)P(2)G(3)+$$
$$P(0)P(1)P(2)P(3)G(4)+P(0)P(1)P(2)P(3)P(4)G(5)+$$
$$P(0)P(1)P(2)P(3)P(4)P(5)Z(6)+$$
$$P(0)P(1)P(2)P(3)P(4)P(5)P(6)G(7).$$

11. The binary adder according to claim 9, wherein said one row of said plurality of rows includes a group propagate signal $P8(0)$ defined by:

$$P8(0)=P(0)P(1)P(2)P(4)P(5)P(6)P(7).$$

12. The binary adder according to claim 9, wherein said one row of said plurality of rows includes a group zero signal $Z8(0)$ defined by:

$$Z8(0)=Z(0)+P(0)Z(1)+P(0)P(1)Z(2)+P(0)P(1)P(2)Z(3)+$$
$$P(0)P(1)P(2)P(3)Z(4)+P(0)P(1)P(2)P(3)P(4)Z(5)+$$
$$P(0)P(1)P(2)P(3)P(4)P(5)Z(6)+$$
$$P(0)P(1)P(2)P(3)P(4)P(5)P(6)Z(7).$$

13. The binary adder according to claim 11, wherein said another row of said plurality of rows includes a group generate signal $G64(0)$ defined by:

$$G64(0)=G8(0)+P8(0)G8(8)+P8(0)P8(8)G8(16)+$$
$$P8(0)P8(8)P8(16)G8(24)+P8(0)P8(8)P8(16)P8(24)G8(32)+$$
$$P8(0)P8(8)P8(16)P8(24)P8(32)G8(40)+$$
$$P8(0)P8(8)P8(16)P8(24)P8(32)P8(40)G8(48)+$$
$$P8(0)P8(8)P8(16)P8(24)P8(32)P8(40)P8(48)G8(56).$$

14. The binary adder according to claim 12, wherein said carry signal equals $G64(0)$.

15. The binary adder according to claim 9, wherein another one of said plurality of rows of carry-lookahead circuits includes a plurality of 64-bit group generate circuits and a plurality of 64-bit group propagate circuits.

16. The binary adder according to claim 9, wherein a sum signal SUM(0) is defined by $HS(0) \otimes C(1)$.

* * * * *